United States Patent Office 3,539,784
Patented Nov. 10, 1970

3,539,784
PROCESS INSTRUMENTATION AND CONTROL THROUGH MEASUREMENTS OF TIME-SEPARATED PROCESS VARIABLES
Robert A. Woodle, Nederland, Tex., assignor to Texaco Inc., New York, N.Y., a corporation of Delaware
Filed July 31, 1967, Ser. No. 657,418
Int. Cl. G06f *15/46;* G06g *7/58*
U.S. Cl. 235—151.12   20 Claims

ABSTRACT OF THE DISCLOSURE

A method and system for monitoring and control of processes such as hydrofinishing, solvent refining, and other processes used in the oil refining industry, wherein measurements of process variables are made at a point early in the process and recorded on a moving memory member, such as a recording chart or tape, the speed of which is regulated as a function of other process characteristics, preferably, in linear relationship thereto. Measurements of process variables are made at a point in time later in the process; and the recorded information is concurrently recovered from a position on the moving memory member bearing a predetermined relationship to the recording means, e.g. the recording head, thereby making concurrently available, in accordance with a predetermined time relationship with said other process characteristics, data of time-separated process variables.

BACKGROUND OF THE INVENTION

This invention relates to a method and system for control and instrumentation of manufacturing processes, and more particularly to the automatic control and instrumentation of chemical processes, such as oil refining, based upon data of time-separated process variables.

Process control based on stored information is known in the art in the oil refining and other industries. Frequently the various steps or operations to be performed are pre-programmed on a tape or punch cards which are played to the machine or process equipment performing the operations. These methods of pre-programmed control, however, do not provide a means for adjustment of the various operations performed, concurrently responsive to the condition of the work product and its rate of treatment, or other time related variables. Oil refining processes due to their relative complexity, are frequently controlled based upon physical measurements of the process conditions or materials, made at points early in the process, which are continuously recorded or stored, and other physical measurements of the process conditions or materials, made at points later in the process, e.g. near completion. The former are reproduced or recovered from storage and by human operation correlated with the latter and calculations performed to determine corrections of the process controls. Indeed, a large number of useful and important process variables are calculated variables, that is, they are derived by mathematical manipulations, from two or more measurements made by process sensing devices. Examples of these sensing devices are stream analyzers, refractometers, flow meters, thermocouples, and the like. Included in the class of calculated variables are such things as conversion, yield, selectivity, percentage removal and others. These types of variables are important to monitor since they are the basis for control of many processes.

Computation of quantities such as the above is usually straight-forward, and the mathematics can be automatically performed using readily available computing elements. These computed quantities are often stored as a record of process performance, or are used for control of the process. However, a serious problem arises during the computation steps due to the fact that the measurement signals which are available to the computing device, or the human observer, from the sensing devices on the process, are not on a comparable time scale. Time separation of calculated process variables frequently leads to complex monitoring and control problems. For example, it is frequently required to compute a quantity which relates a measurement made on the product issuing from a process to a measurement made on the charge stock from which that product was derived. In most instances there is a finite residence time T of material in the process. Therefore, the product being produced at any moment in time is derived from charge material that entered the process T minutes or hours earlier. If a conventional instrumentation system is utilized, this time product measurement must be combined in some way with a charge measurement made T time units earlier. However, the latter would be availabe only as an ink mark on a recorder chart, or information on a tape, depending upon the recording means used. Therefore, intervention of a human observer is normally required to read the earlier recorded information at the proper time and correlate it with the later obtained information.

Of course, if the compositions of the materials entering the process and the charge rates of the process inputs could be held constant correlation of these time-separated process measurements would be much simplified since a fixed time delay could be applied to the earlier measurements. In actual practice, however, charge stocks vary in composition and rate from moment to moment. Some of these changes are relatively large even when processing the contents of a tank of prepared charge due to stratification or incomplete mixing. Other large changes result when changing from one batch or type of charge to another or when shifting operating conditions to produce different products. Thus, compositions and rates of feeds and product vary continuously. In addition, the residence time T in general is not a constant but may vary over a range of values depending upon the nature of the process and the rate at which material is charged to the process. Hence, in the present art when it is required to determine calculated process variables which are time-separated in accordance with the residence time of material in the process it is necessary to maintain a continuous record of residence time and continually calculate adjustments thereof in accordance with varations in the charge rate. This residence time is appropriately applied as a time delay, by tedious point-to-point analysis, to measurements of process variables made early in the process, which are then correlated with similar measurements made at points later in the process and the desired calculated process variables are then computed.

Another example of interest is that class of processes where it is necessary to relate certain measured process variable to others which are time-separated as a function of still other process variables. For example, during laboratory test runs it is frequently necessary to vary the physical condition of materials entering or undergoing treatment in a process. The pressure, temperature, or other physical parameters may be varied and the overall performance of the process monitored by sensors located at points of interest in the process. In these instances, the present invention provides a useful and important means for analysis of the process whereby the process performance data is recovered as a time-function of the varied parameters, thereby providing transient analysis and pre-production evaluation data.

One method heretofore used by which this may be done is by continuously monitoring all parameters including those which are deliberately varied, and pointby-point correlation of the recovered data. The disadvantage of this prior art method is that it requires costly and time consuming point-by-point analysis of the process. Another approach to this, and to the problem illustrated by the aforementioned first example, is to program a conventional computer to analyze and store early process data, to recall the stored data in response to other process variables, and compute the desired calculated process variable, based upon the recalled data and physical measurements of the process materials near completion. Such a program would be considerably complex and costly in preparation and maintenance. Furthermore, the risk of down-time of the process would be increased due to the complexity of the program and of the computing equipment. Due to cost impact this would be particularly objectionable if this method were to be used during production runs. It is clear therefore that for those processes where computation of calculated variables is required, which may be used for monitoring, recording, or for process control, a simple automatic method of regeneration of one or more recorded signals, following a variable and controllable delay time is required. The invention as herein disclosed provides this capability by a unique and novel method employing the use of recording and playback equipment arranged in a unique and novel combination.

SUMMARY

Briefly stated, a preferred aspect of the invention provides a method for monitoring and control of processes wherein one or more measurements of process variables are made and stored on a moving memory member the speed of which is regulated as a function of other variables of the process. Measurements of process variables are made at a point in the process which is time-separated from that of the former, and the recorded information is concurrently recovered from a position on the moving memory member bearing a predetermined time relationship to the latter measurements; thereby, making concurrently available measurements of time-separated process variables which can be used for various purposes including analysis, display, or automatic control.

Another aspect of the invention provides apparatus comprising novel combinations of recording and playback equipment which may be used for practicing the methods of the invention. Briefly stated, such apparatus in part includes means for measuring one or more process variables, and novel recordinng means for recording the measurements upon a moving memory member. The speed of the memory member is varied by a speed regulator which responds to signals from other measuring means provided to measure other variables of the process. Additional measuring means are provided to measure process variables which are time-separated from the measured variables recorded. Also provided are recovering means to recover the recorded information from a position on the moving memory member bearing a predetermined time relationship to the aforementioned means for measuring the time-separated variables. In one embodiment illustrated, the recovery means includes an electrical resistance element used in novel combination with a conductive element, to recover the signal recorded by use of electrically conductive ink.

In view of the foregoing it is an object of the invention to provide a simplified method for monitoring and control of processes having the capability of storage and recall of process data responsive to variables of the process.

Another object of the invention is to provide a method for recording process data at a rate responsive to other variables of the process.

Another object of the invention is to provide a simplified method for time delay of process data responsive to variables of the process.

Another object of the invention is to provide a simplified method for making concurrently available measurements of time-separated process variables time coordinated in response to other measured variables of the process.

Another object of the invention is to provide a simplified method for control of processes responsive to measurements of time-separated process variables.

Another object of the invention is to provide a simplified method for monitoring a solvent refining process.

Another object of the invention is to provide a simplified method for control of a hydrofinishing process.

Another object of the invention is to provide various embodiments of apparatus to fulfill the aforementioned objectives.

These and other objects, advantages and features of the invention will be more fully understood by referring to the following description and claims, taken in conjunction with the accompanying drawings.

DESCRIPTION OF THE PREFERRED EMBODIMENTS

As used herein the terms process sensor and process rate sensor apply to devices which sense a measurable change in a physical property or condition and produce a signal corresponding thereto. Examples of such signals are pneumatic signals, electrical signals, and electrical resistance changes. Examples of sensors are thermocouples, pressure transducers, refractometers, photoelectric tubes, and the like. Rate sensors are differential sensing devices which produce similar signals in response to changes of one physical condition with respect to another, such as flow rate transducers or concentration change sensors and the like.

As used herein the term time-separated in association with measurements of process variables applies to functional time separation and physical time separation. To illustrate the former, let us imagine a length of pipe through which a fluid is flowing having a sensor measuring temperature, or any other physical parameter of the fluid, at its inlet and one at its outlet. Due to the fact that the fluid is flowing a certain period of time will transpire from the moment a particular particle of the fluid passes the inlet sensor, to the moment the same particle passes the outlet sensor. Yet both sensors may be made to function simultaneously, providing continuous information. When it is necessary to evaluate the information in precise correlation to a particular segment of the fluid it will be necessary to apply a time correction to the upstream measurement. In this example the measurements are said to be functionally time separated.

To illustrate physical time separation let us imagine a large tank containing a fluid undergoing a transient stimulation, for example, heating, and having a temperature sensor at some point in contact with the fluid. The sensor may be made to register the temperature at some moment in time $T_1$ and then again at some moment later in time $T_2$. The same, or another sensor may be used to make the later measurement. In this instance it may be desired to make the time period $T_2-T_1$ proportional or analogous to the intensity of the stimulation, for example, the heating rate or the electrical power to the heating element. In this case a comparison of the two measurements will yield important information of the reaction of the fluid and the process equipment, to the stimulus. Also, the two measurements may take the form of a continuous flow of information from the same sensor divided into two signals, one of which is appropriately time delayed. In this example the measurements are also referred to as time-separated even though they may be continuously made by the same sensor. While these are but two examples of time separation, the phenomena may take on many forms depending upon the nature of the process to which the invention is applied.

Figure 1:
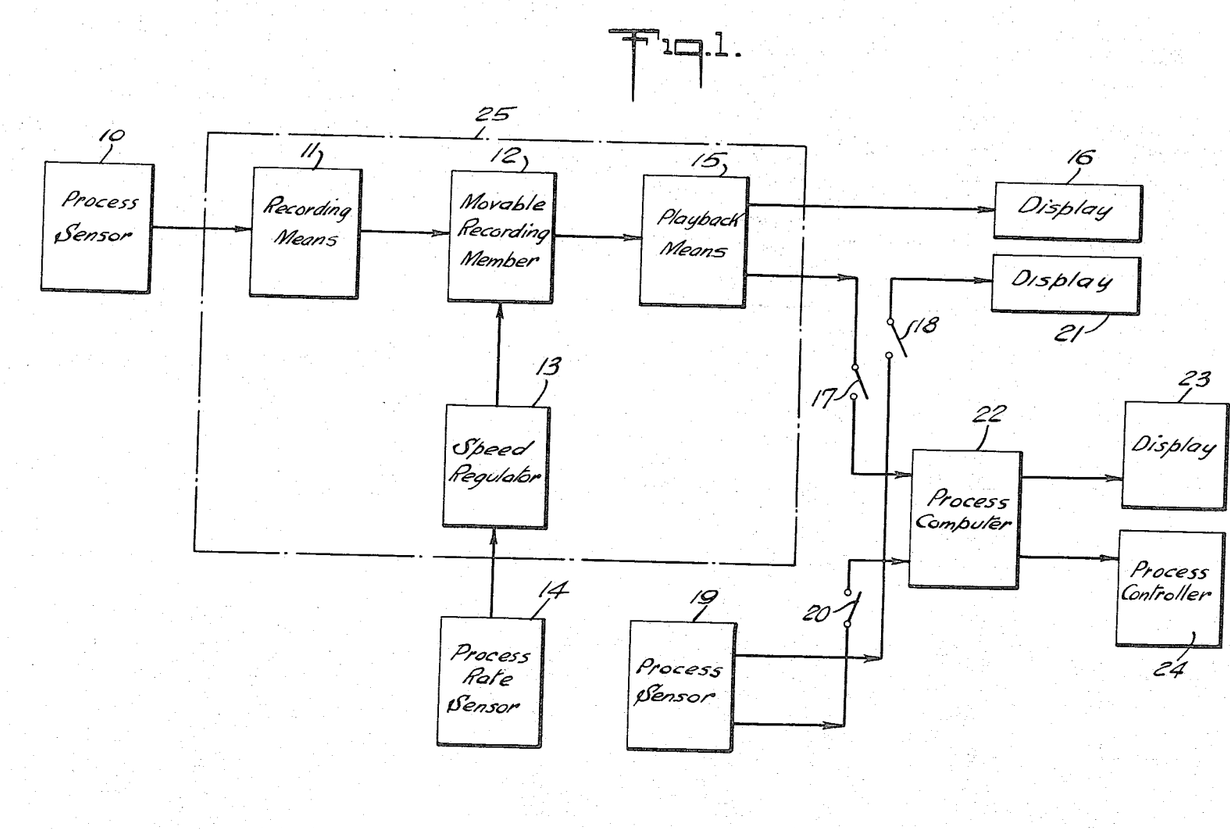
FIG. 1 is a schematic block diagram illustrating a process control system for practicing the invention.

Referring now to FIG. 1, a first process sensor 10 is provided for measuring a physical parameter of a given process and is shown having its output signal coupled to recorder 25 containing a recording means 11, which records the signal on a movable recording member 12 which moves at a variable and regulated speed. A process rate sensor 14 is provided to measure a significant rate variable of the process and transmits a corresponding signal to a speed regulator 13 which, in turn, regulates the speed of the movable recording member 12. A playback means 15 is mounted along the path of motion of movable recording member 12 and is spaced a selected distance from the recording means 11 so that the recorded signal recovered by the playback means 15 is delayed a desired time interval as determined by such spacing. The time interval of the delay is further regulated through the effect of the aforementioned speed regulation. The recovered signal derived by the playback means 15 is then transmitted over a suitable signal channel to a display device 16 which may be a display meter, a chart recorder, or the like. Switches 17, 18 and 20, which are of the normally closed type, are included to provide for utilization, as required, of the recovered signal in conjunction with a signal from a second process sensor 19 and a process computer 22. When the foregoing method is used to effect an automatically controllable time delay of a process measurement, switches 17, 18 and 20 may be left in the opened position. When the method is used to make concurrently available measurements of time-separated process variables, the playback means 15 may be positioned a desired distance from recording means 11 in relationship to a second process sensor 19, which measures a process variable which is time-separated from the process variable measured by said first process sensor 10. In this case switch 18 is in the closed position and switches 17 and 20 may be left in the opened position. The signal from the second process sensor 19 will be transmitted through switch 18 to a display device 21 where it can be observed concurrently with display device 16 where the recovered measurement may be observed. In those instances where it is desirable to compute calculated process variables, switches 17 and 20 are in the closed position making concurrently available, the recovered signal through switch 17, and the signal from the second process sensor 19 through switch 20, to a process computer 21, which performs the desired calculation and transmits an output signal to a display device 23, where the calculated variable may be observed. In those instances where the method is to be used to control the process the computer output is transmitted to a controller 24 which generates and transmits control signals to such equipment in the process as heating elements, flow control valves and the like.

Figures 2, 3:
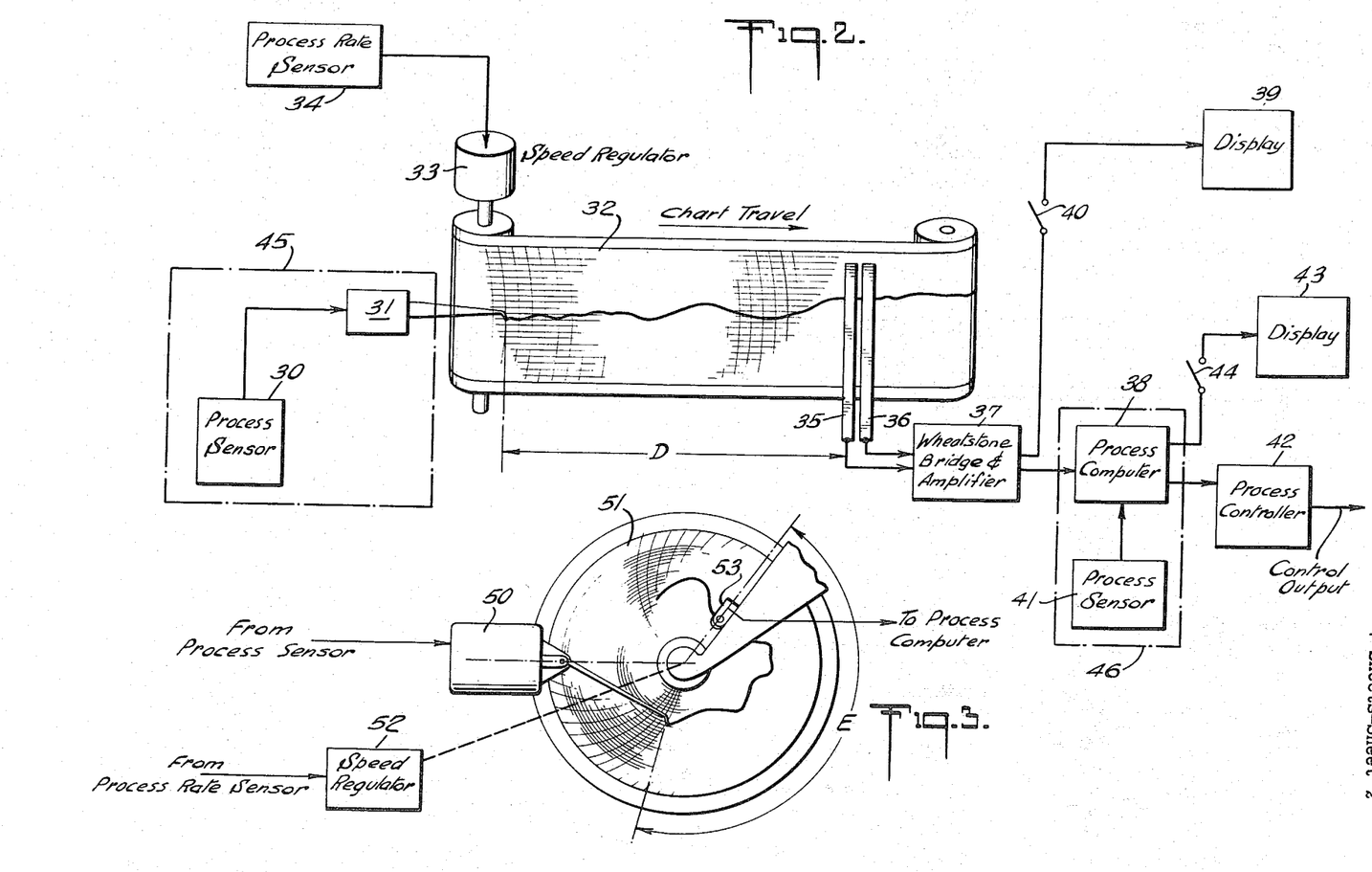
FIG. 2 is a schematic view, including block diagram elements, of a conventional strip chart recorder adapted for the practice of the invention.
FIG. 3 is a schematic diagram, partly in block form, showing a plan view of a circular chart recorder illustrating an alternate embodiment of recording and recovering means which may be used for the practice of the invention.

Referring now to FIG. 2, there is provided a first process sensor 30 which measures a process variable and transmits a corresponding signal to a recording pen 31 which, by use of electrically conductive ink similar to that disclosed by Sumi, Japan, 137,741, Aug. 5, 1940, noted in Chemical Abstracts, vol. 35, column 2081 (1941), records the measurement on a strip chart 32 which is moved at a speed regulated by a speed regulator 33 which regulates the movement of the chart at a speed in response to a signal from a process rate sensor 34, which measures a process rate variable. An electrical resistance element 35 having a resistance which varies linearly with its length is mounted so as to remain stationary and is placed across the chart in electrical contact with the conductive recorded line. It is located at a distance D from the recording pen which corresponds to the average delay time required between the recording of the measurement signal and its recovery. This delay time, however, is further regulated automatically due to the influence of the aforementioned speed regulation of the chart. A conducting bar 36 is similarly mounted in a position immediately adjacent to resistive element 35, but electrically isolated therefrom, and is also in electrical contact with the recorded line. Therefore, an electrical path will exist through resistive element 35, the conductive element 36, and the recorded line between these elements. The resistance of this path will depend upon the position of the recorded line at its point of intersection with resistive element 35. This resistance will increase when a greater length of resistive element 35 is intersected by the recorded line and will decrease when a smaller length is intersected. This electrical path is connected to a wheatstone bridge and amplifier 37 in which the variable resistance of resistive element 35 forms a leg of a wheatstone bridge circuit, the unbalance voltage of which is amplified and transmitted to a process computer 38, and should it be desired to observe the recovered signal it is transmitted to a display device 39. In this instance switch 40 is in the closed position.

When the recovered signal is utilized to determine a calculated process variable, process computer 38 performs the calculation in response to the recovered signal and an input signal from a second process sensor 41. The output of the process computer may be utilized to control the process through a process controller 42 or may be displayed by a display device 43, which may be introduced by the closing switch 44.

The invention is especially advantageous to simplify monitoring and control, when used in production in association with a process wherein the material inventory undergoing treatment remains substantially constant, as is the case in most refining processes. In this case the distance D between the recording pen 31 and the resistive element 35 is made analogous to the distance in the process equipment between sensor 30 and sensor 41. The average speed of the chart is made analogous to the rate of flow of material undergoing treatment in the process. This rate may be determined in advance analytically, or experimentally by use of radioactive or dye tracers. Variations of flow of process material are sensed by a flow meter which in this instance performs the function of process rate sensor 34, and the speed of the chart is regulated accordingly. Since the material inventory is substantially constant a single measurement of flow will suffice. Therefore, in this instance, the speed of the chart will at all times be proportional to the flow rate of material undergoing treatment in the process and all points along the chart between the recording pen and resistive element 35 will represent points along the process equipment between the first process sensor 30 and the second process sensor 41.

It is seen, therefore, that for those processes which have a substantially constant material inventory, the distance along the recording member represents the residence time in the process equipment downstream from process sensor 30 to the terminal point in the process. If process sensor 30 is measuring a physical parameter of the process charge, the distance along the recording member will represent elapsed time taken by the charge to reach various points along the entire process to completion. Therefore, it is possible to have a direct correlation of the measurement made on the charge, with a measurement made on the same material anywhere downstream in the process. When the downstream measurement is at a point in the process near completion, and the recovery point on the chart made to coincide therewith, the data may be used to compute the calculated process variables associated with the overall performance of the process, and the process controlled accordingly by a continuous feedback loop. Since the time-separated variables are made concurrently available in accordance with the present invention, the calculations can be easily performed using readily available analog computing elements resulting in greatly simplified automatic process control.

In general, the invention may be practiced by application of any signal carrying means. It is to be understood that in accordance with the present invention electrical or pneumatic signals and combination thereof are intended to be included, and for example may be practiced by variations of the equipment depicted in dotted blocks 45 and 46, the functions of which are further illustrated in FIG. 4.

Referring now to FIG. 3, which illustrates an alternate embodiment of the recording means which may be used in conjunction with the system described above, a first process sensor signal is transmitted to a recording pen 50 which records the signal on a rotatably movable circular recording chart 51. The angular speed of the recording chart is regulated by a speed regulator 52 which engages the drive shaft of the chart and drives it at a speed in response to a signal from a process rate sensor. The desired time delay is affected by mounting a recovery device 53 an angular distance E from the recording pen. A suitable recovery device of the type illustrated herein is an optical tracking device similar to that marketed by Leeds & Northrup under the trademark Trendtrack, which develops an electrical signal proportional to the radial position of the recorded line. This signal is then utilized as indicated above in reference to FIG. 1.

Figure 4:
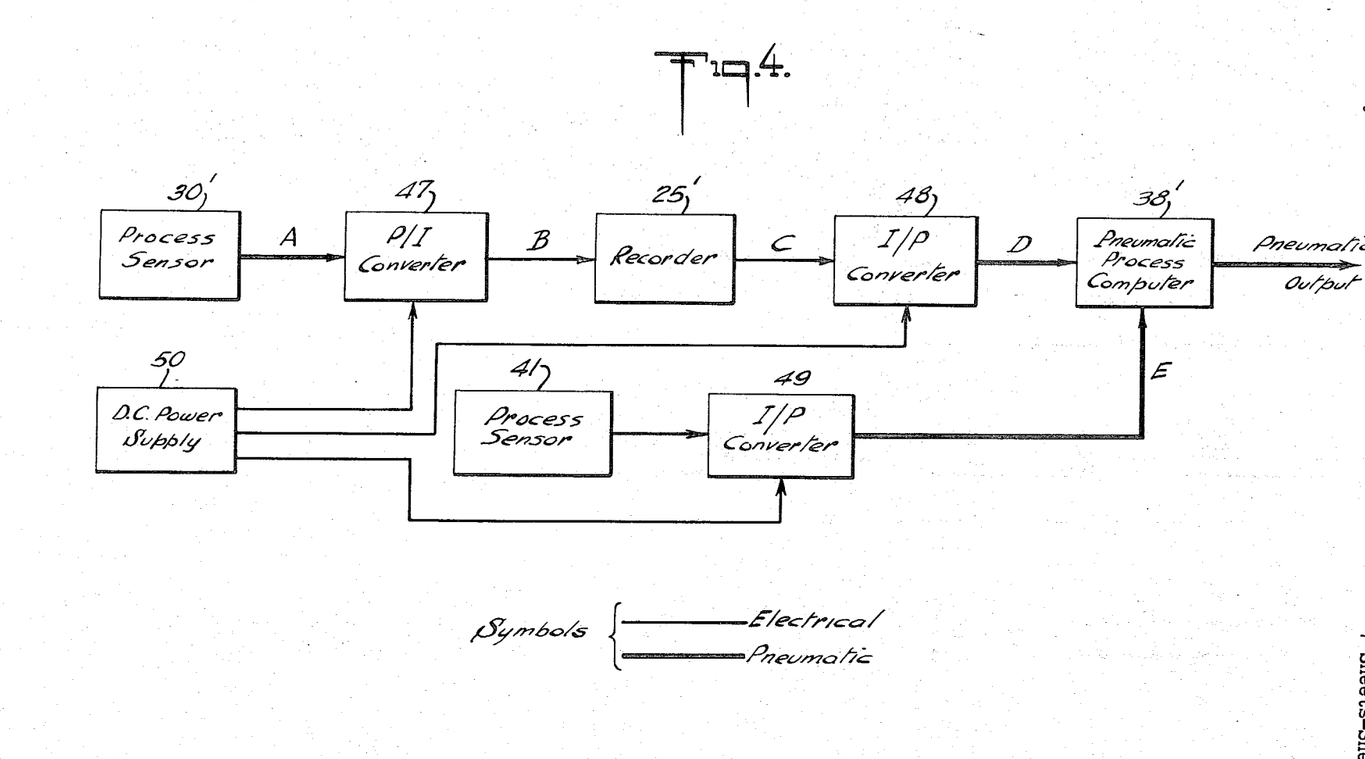
FIG. 4 is a schematic block diagram illustrating the signal processing which may be used in practicing the invention in conjunction with electrical and pneumatic signals.

FIG. 4 illustrates the use of electrical and pneumatic signals, which may be interchangeably used in practicing the invention. In this figure, elements similar to those referred to in preceding figures of the drawings are identified with the same numeral used previously but bearing a prime designation. Process sensor 30' measures a process variable, and generates a pneumatic signal A in the form of air pressure, the magnitude of which represents the measured parameter. The pneumatic signal may be generated from a source of air pressure by operation of a pressure regulator by the sensing element, or it may be a direct pressure measurement of the process stream. Essentially, any range of the pneumatic signal may be used depending upon the resolution required in the range of the measured parameters. Suitable ranges are 3–15 p.s.i.g., 3–18 p.s.i.g. and 3–27 p.s.i.g., all of which may be carried by commercially available tubing. Recorder 25' incorporates the elements depicted in FIG. 1. If it is of the type requiring an electrical form of signal to be recorded, a pressure to current converter 47 will be interposed between process sensor 30' and the recorder. Pressure to current converters are known in the art and generally include a pressure diaphragm or equivalent pressure responsive means coupled to electrical elements such as the core of a coupling transformer or the arm of a potentiometer in a voltage divider circuit. An output current of this device of 4–20 milliamperes flowing through an output resistor of 25 ohms will generate an output signal B, across the output resistor of 100 to 500 millivolts which is suitable for most recorder input circuits, and will represent variations of the pneumatic signal through the measurement range. The signal is time delayed in the recorder as discussed in reference to FIG. 1. The electrical output signal C from the recorder, representing the recovered measurement signal, will be converted to a pneumatic signal D by a current to pressure converter 48 in those instances when pneumatic computing elements will be utilized in process computer 38'. Current to pressure converters are known in the art and generally consist of electrically operated regulators. For ease of transmission it is preferred that the pressure range of signal D be approximately the same as that of signal A. In those instances when process sensor 41' is of the type producing an electrical signal corresponding to its measured parameter, a similar current to pressure converter 49 may be interposed between this process sensor and the pneumatic process computer 38'. The computer may utilize pneumatic computing elements such as pressure to pressure regulators, or pressure switches should pneumatic logic circuits be utilized. Generally, a pneumatic output is advantageous when the process control functions are of a pneumatic nature such as the regulation of process pressures. A power supply 50 is shown which may be used as a common source of direct current power for the converters, and for other equipment as required, or alternatively each equipment assembly may incorporate its own integral power supply. It should be noted that the signal conversion elements discussed above may be interchanged as required depending upon the nature of the sensing elements used, and the recording, computing, and control means desired.

Figure 5:
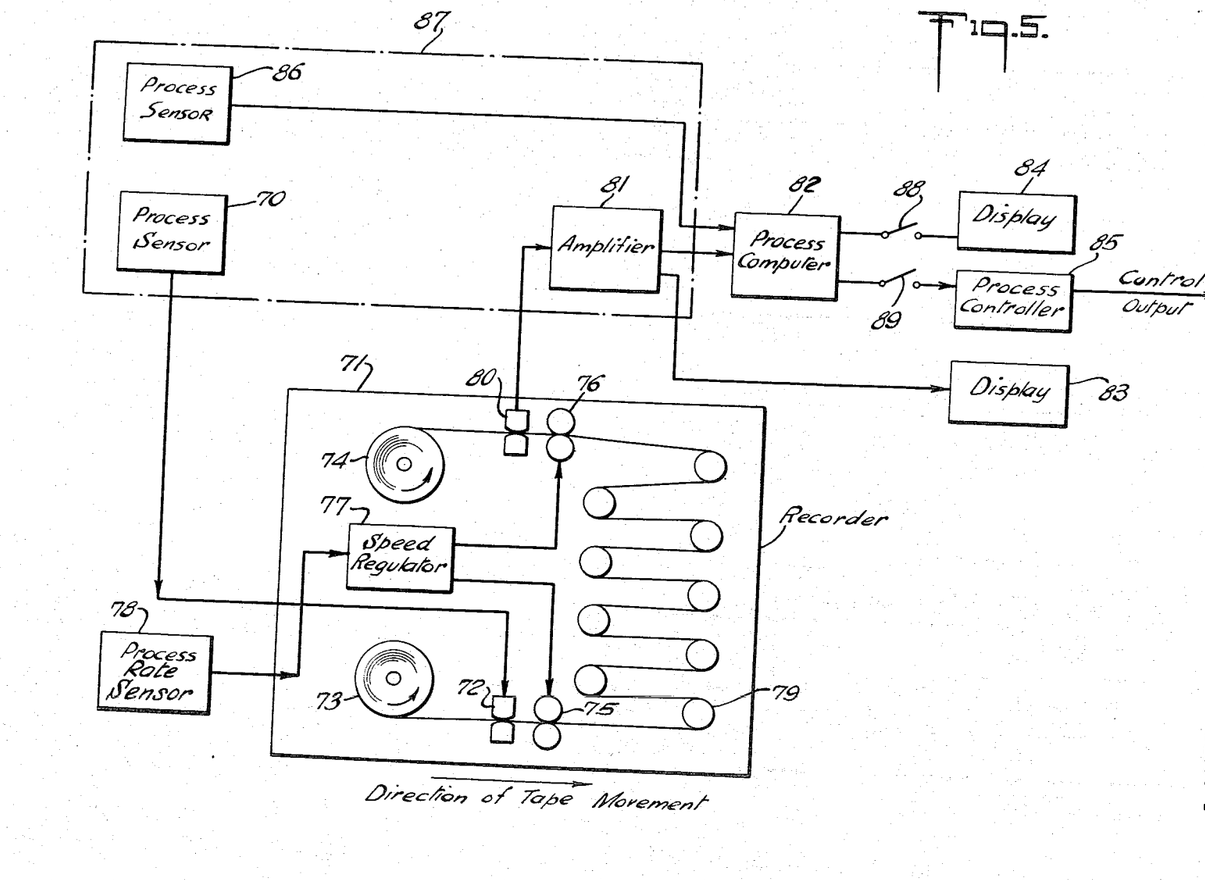
FIG. 5 is a schematic diagram, partly in block form, showing a plan view of a conventional electronic tape recorder adapted for the practice of the invention.

Referring now to FIG. 5 which illustrates an alternate embodiment utilizing a modified electronic tape recorder, a first process sensor 70 is provided for measuring a physical parameter of a given process and is shown having its output signal coupled to an electronic tape recorder 71 where the signal is conventionally preamplified and, in turn, recorded upon electromagnetic tape by a recording head 72. A tape feed spool 73 and a take-up spool 74 are conventionally mounted and driven. The tape is driven by tape drives 75 and 76 which drive at equal speeds and which, in turn, are regulated by a speed regulator 77. The latter regulates the speed of the tape drives 75 and 76 in proportional response to a signal from a process rate sensor 78. This process rate sensor is provided to measure a significant rate variable of the process and produce a signal proportionally corresponding thereto. Subsequent to passing through the recording head 72 the driven tape is fed through a random path around idler rollers 79, the free length of which determines the average delay time between recording and playback. A playback head 80 is mounted at the end of this path to recover the recorded information. Any number of idler rollers may be used depending upon the average delay time required. Two tape drives 75 and 76 are used, one before the tape enters the section of rollers, and one at its exit, to insure smooth and free movement of the tape through the rollers. Additional drives may be used at intermediate locations within the section of rollers when required to overcome accumulated friction due to the quantity of rollers used and the free length of tape therewithin. The recorded signal as recovered by playback head 80 is transmitted to an amplifier 81 which amplifies the signal and transmits it to a process computer 82 and a display device 83. The signal thus recovered may in conjunction with a signal from a second process sensor 86 be utilized by the display devices 83 and 84 or by a process controller 85 as discussed above in reference to FIG. 1. In these instances the switches 88 and 89 may be appropriately placed in either the open or closed position as required. The nature of the signal processing to be performed by the equipment depicted in the dotted block 87 depends upon the desired signal format to be recorded and utilized by the computer. Two alternatives are depicted in FIGS. 6 and 7.

Figure 6:
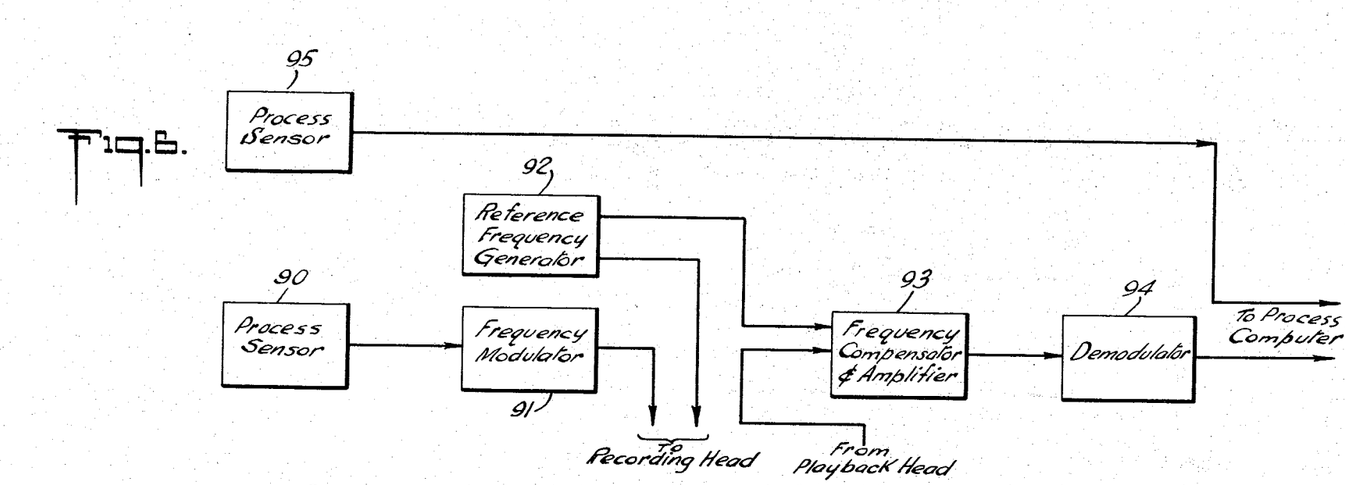
FIG. 6 is a schematic block diagram illustrating an alternate method of signal processing which may be used in practicing the invention by electronic tape recording of frequency modulated signals.

Referring now to FIG. 6, a process sensor 90 measures a first process variable and transmits a signal proportional thereto to a frequency modulator 91, which develops a signal the frequency of which is an analog of the measured parameter, and transmits it to the recorder. A preferred analog frequency range is 7.2 to 247.2 c.p.s. Since recording is done at a variable speed, it is necessary to record a reference frequency signal of approximately 100 c.p.s., which is developed by a reference frequency generator 92, and concurrently transmitted to the recorder with the analog of the measurement signal, where they are recorded and subsequently recovered in accordance with the desired time delay discussed in reference to FIG. 5. A low recording speed is preferred to minimize the free length of tape between the recording and playback heads. At a recording speed of 3/16 inch per second a free tape length of 56.3 feet between these heads is required to accommodate a delay time of one hour. The recovered signals from the playback head are transmitted to a frequency compensator and amplifier 93, which compares the reference frequency signal with the recovered reference signal, and applies a correction to the recovered measurement signal frequency either adding thereto or subtracting therefrom, according to the effect of the speed regulation which continually occurred during the recording and playback. The signal thus corrected is amplified and transmitted to a demodulator 94, which demodulates the signal to a direct voltage analog representing the corrected recovered signal. This signal, along with a signal from a process sensor 95 which measures a process variable time-separated from that measured by sensor 90, is concurrently transmitted to a process computer and a display device where it is subsequently utilized as discussed in reference to FIG. 1.

Figure 7:
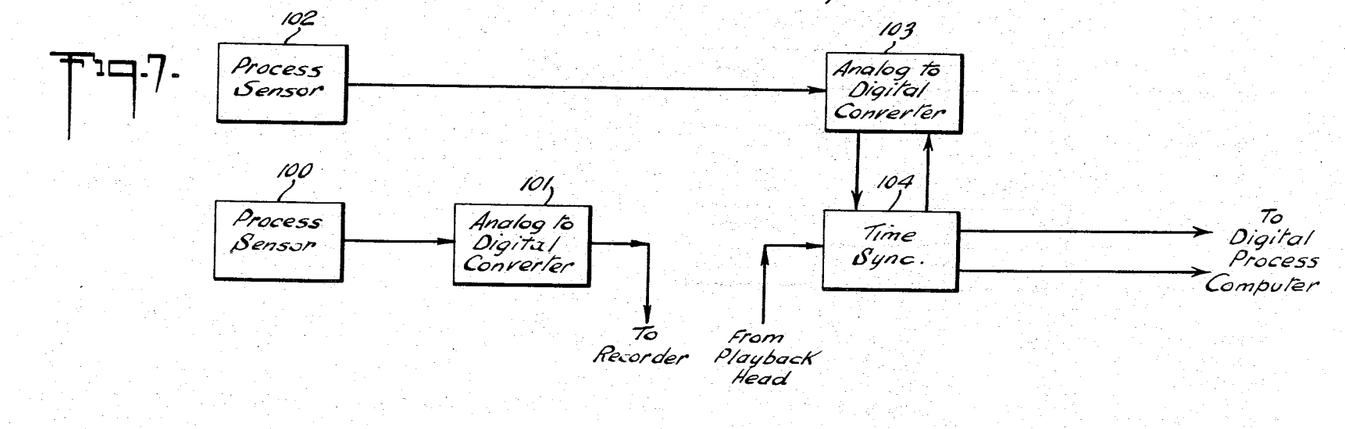
FIG. 7 is a schematic block diagram illustrating an alternate method of signal processing which may be used in practicing the invention by electronic tape recording of digital signals.

FIG. 7 illustrates a method of signal processing to be used when it is desired to record and to perform the computational steps using digital techniques. A signal corresponding to a measurement of a first process variable is transmitted from a process sensor 100, to an analog to digital converter 101, of conventional design, which converts the signal to binary serial digital format, and transmits it to the recorder, where it is time delayed and recovered as dicussed above. A signal from process sensor 102, corresponding to a measurement of a second process variable time-separated from said first process variable, is similarly converted by converter 103 and digitally synchronized with the recovered signal from the recorder, by time synchronizer 104. The two synchronized signals are then delivered to a digital process computer which performs the desired computational steps and transmits the resulting signals, as required, to a digital display or a process controller, for utilization as discussed in reference to FIG. 1.

Figure 8:
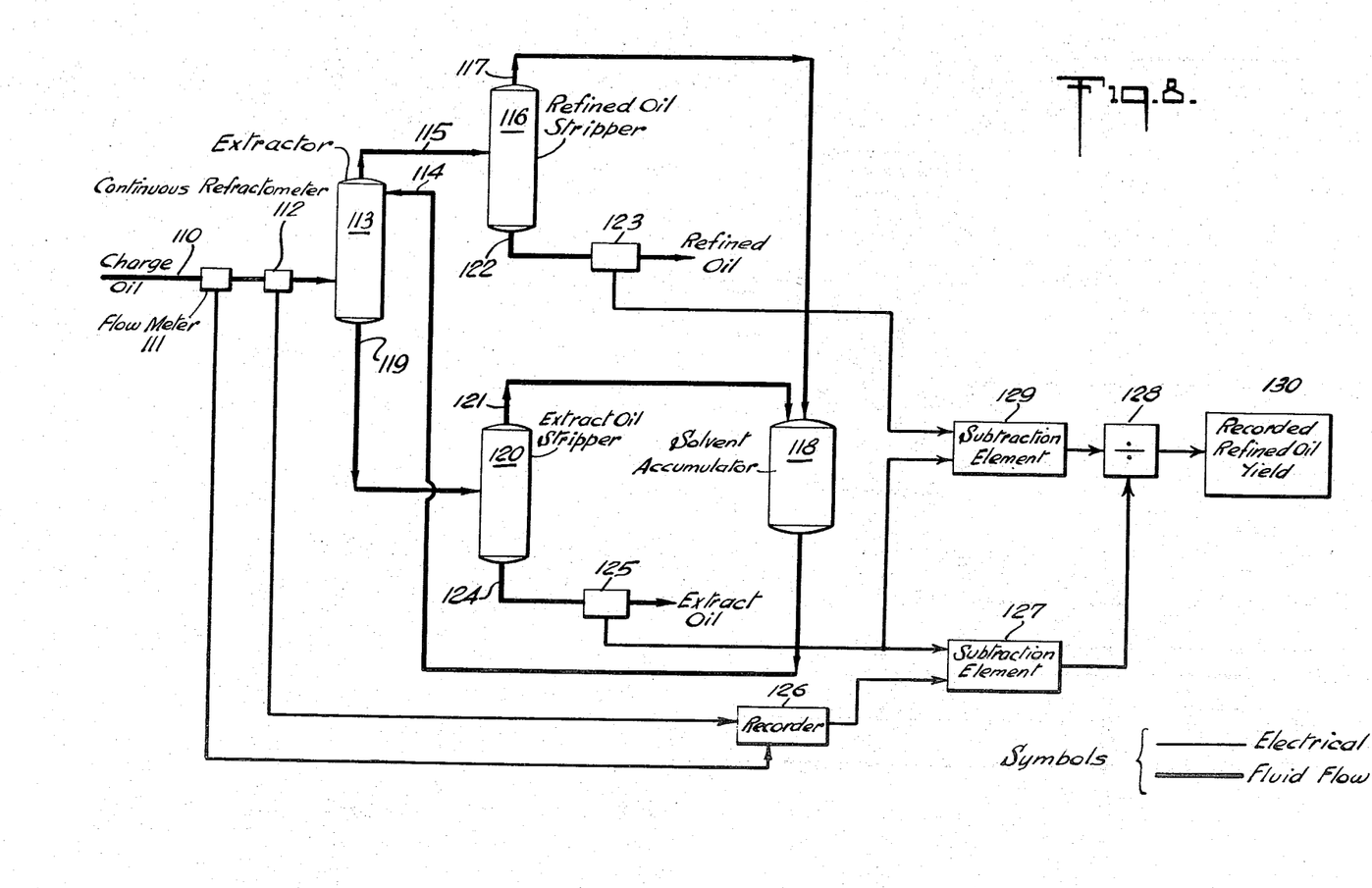
FIG. 8 is a schematic flow diagram, partly in block form, illustrating one embodiment of the invention adapted for the use of monitoring a solvent refining process.

FIG. 8 illustrates the invention applied to the monitoring of yield of a solvent refining process, e.g. furfural refining. Charge oil, from an appropriate source not shown, enters the process through line 110 to which is connected a flow meter 111 for measuring the flow rate of charge oil and producing a signal corresponding thereto. Also connected to the inlet line is a continuous refractometer 112 for measuring the refractive index of charge oil and producing a corresponding signal. The inlet charge then enters an extractor 113 to which furfural solvent is recirculated from a solvent accumulator 118. The furfural solvent reacts with the charge oil in the extractor 113 forming therein furfural solutions of refined oil and extract oil. Refined oil and solvent are removed from the extractor 113 overhead through a line 115 which is connected to a refined oil stripper 116 which effects separation of the solvent from the refined oil. Solvent is removed from stripper 116 overhead through a line 117 to a solvent accumulator 118. Refined oil exits from stripper 116 through its bottom line 122 to which is connected a continuous refractometer 123 which measures the refractive index of refined oil and produces a signal corresponding thereto. Refined oil then exits from the process, through the line designated Refined Oil. Extract oil and solvent are removed from extractor 113 through its bottom line 119 which is connected to an extract oil stripper 120 which effects separation of the solvent from the extract oil. Solvent is removed from stripper 120 overhead through line 121 to solvent accumulator 118 from where the solvent is recirculated to extractor 113. Extract oil is removed from stripper 120 through its bottom line 124 to which is connected a continuous refractometer 125 which measures the refractive index of extract oil and produces a signal corresponding thereto. Extract oil then exits from the process through the line designated Extract Oil.

The signal from charge refractometer 112 is continuously recorded and recovered by recording device 126 which operates as discussed above in reference to FIG. 2, the recording chart of which is driven at a speed proportional to the charge rate of the process in response to the signal from flow meter 111. Therefore, the recovered signal will represent the refractive index of the charge from which presently produced product was made. Generally, long residence times are common in condensed phase processes such as solvent refining. In this application the residence time between charge refractometer 112 and output refractometers 123 and 125 averages 2 hours, and the recording chart illustrated in FIG. 2 is moved at an average speed of 6 inches per hour. The distance D is set at 12 inches. The recovered signal from the recorder is transmitted to a subtraction element 127 which subtracts this signal from the signal of refractometer 125, and transmits the difference signal to a division element 128. The signal from refractometer 123 is transmitted to a subtraction element 129 which subtracts this signal from the signal of refractometer 125, and transmits the difference signal to division element 128, which divides the former difference signal by the latter difference signal. The quotient signal thus developed is recorded by a recorder 130 and represents the yield of the process in accordance with the following equation:

$$\text{YIELD} = \frac{\text{R.I.}_{\text{ext oil}} - \text{R.I.}_{\text{chg oil}}}{\text{R.I.}_{\text{ext oil}} - \text{R.I.}_{\text{ref oil}}}$$

Figure 9:
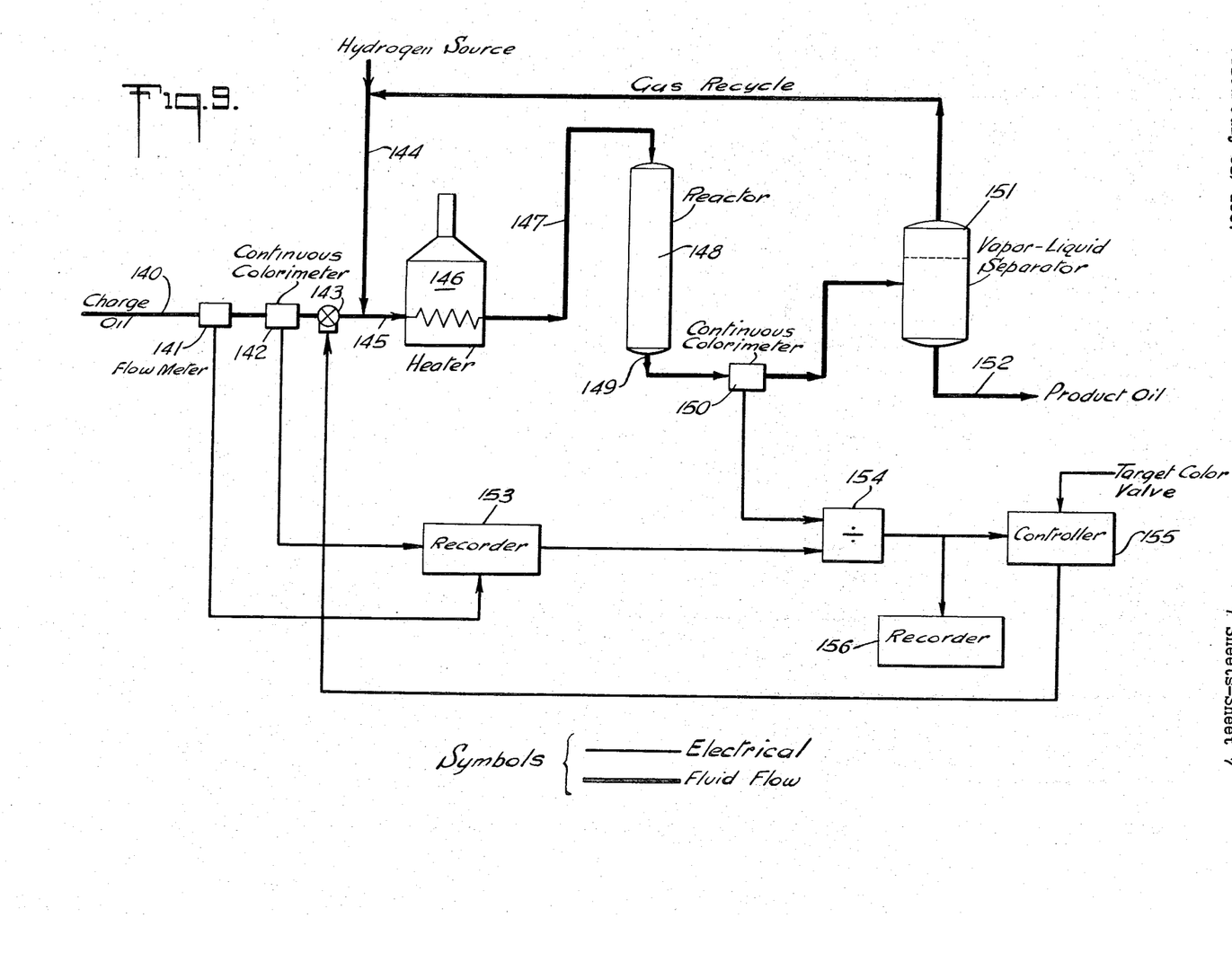
FIG. 9 is a schematic flow diagram, partly in block form, illustrating one embodiment of the invention adapted for the control of a hydrofinishing process.

FIG. 9 illustrates the invention applied to the use of controlling an oil hydrofinishing process where the object of the process is to improve the color of the product oil to a constant fraction of the color of the charge stock. Charge oil, from an appropriate source, not shown, enters the process through a line 140 to which is connected a flow meter 141 which measures the flow rate of charge oil and produces a signal corresponding thereto. Also connected to the inlet line is a continuous colorimeter 142 which measures the standard color value of the charge oil and produces a corresponding signal. Subsequent to the colorimeter there is connected to the inlet line an electrically operable flow control valve 143 which adjusts the inward flow rate of charge oil in response to an electrical control signal. Hydrogen gas is subsequently introduced at a substantially constant flow rate through a line 144, and admixes with the oil in a line 145, and the mixture passes through a heater 146 and then through a line 147 to a reactor 148. Treated oil exits from the reactor through a line 149 to which is connected a continuous colorimeter 150, which measures the standard color value of treated oil and produces a corresponding signal. The oil then flows into a vapor-liquid separator 151 which separates excess hydrogen from the product oil and the product oil then leaves the process through a line 152 which is connected to the liquid outlet port of the vapor-liquid separator 151. Excess hydrogen is recycled from the separator 151 to line 144 at the process inlet to which make-up hydrogen is added from an appropriate source, not shown.

A signal proportional to the standard color value of the charge stock is transmitted from colorimeter 142 to recording device 153, which operates as discussed above in reference to FIG. 2, where the signal is recorded, then recovered after a time corresponding to the oil residence time in the process, by the effect of the proper positioning of the signal recovering means and control of the recording chart speed proportional to a signal of the process charge rate from flow meter 141. In vapor phase processes such as hydrofinishing the residence time is generally small, and in this application averages 10 minutes between charge colorimeter 142 and output colorimeter 150. An average chart speed of 90 inches per hour is preferred and the distance D of FIG. 2 may be set at 15 inches. A signal proportional to the product oil color value is transmitted from colorimeter 150 to a division element 154. The recovered charge oil color signal from recorder 153 is also transmitted to division element 154, which divides the former signal by the latter, and produces a quotient signal which is transmitted to a controller 155, and a recorder 156, which records the quotient signal as a record of the process. The controller 155 compares the quotient signal to a target fractional color value signal, developed therein corresponding to its set point which is manually entered. When the quotient signal exceeds the target value signal the controller transmits a command signal to automatic flow control valve 143, operating it toward its closed direction thereby decreasing the relative proportion of charge oil to hydrogen, having the corrective effect of decreasing the color value of the product. When the quotient signal is lower than the target value signal the controller will operate the charge flow control valve toward its open direction thereby increasing the proportion of charge oil to hydrogen, having the corrective effect of increasing the color value of the product. It is seen, therefore, the process is controlled by continuous and instantaneous comparison on input and output color conditions, the former being appropriately time delayed in accordance with the residence time of the process.

While the invention has been described with a certain degree of particularity it can, nevertheless, be seen by the examples hereinabove set forth that many modifications and variations of the invention may be made without departing from the spirit and scope thereof.

I claim:

1. A method for making concurrently available signals representative of time-separated variables of a process which are time separated by a variable time interval in accordance with a given rate variable of said process, comprising the steps of:
    (a) sensing a process variable having a significant relationship to said process and generating a first signal corresponding thereto;
    (b) recording a value representing said first signal on a movable recording member;
    (c) moving said recording member and regulating its speed in a manner so that its speed is maintained substantially proportional to said given rate variable of said process;
    (d) sensing a process variable having a significant relationship to said process, said sensing (d) being performed at a point which in relation to the progress of said process is subsequent to said sensing of step (a), and generating a second signal corresponding thereto; and
    (e) concurrently with said second signal generating step (d) recovering the information recorded by said recording step (b) from a position on said recording member in predetermined time relationship to said sensing of step (d), and generating a third signal corresponding to said recovered information, thereby providing concurrent second and third signals representative of time-separated variables of said process.

2. The method of claim 1 wherein said first signal of step (a) is an electrical signal and wherein said recording step (b) comprising electromagnetically recording a value representing said first signal.

3. A method for making concurrently available signals representative of time-separated variables of a process which are time-separated by a variable time interval in accordance with a given rate variable of said process, comprising the steps of:
    (a) sensing a process variable having a significant relationship to said process and generating a first signal corresponding thereto;
    (b) recording a value representing said first signal on a movable recording member;
    (c) sensing said given rate variable of said process, and generating a second signal corresponding thereto;
    (d) moving said recording member and regulating its speed in rsponse to said second signal in a manner so that its speed is maintained substantially proportional to said given rate variable of said process;
    (e) sensing a process variable having a significant relationship to said process, said sensing (e) being performed at a point which in relation to the progress of said process is subsequent to said sensing of step (a), and generating a third signal corresponding thereto; and
    (f) concurrently with said third signal generating step (e) recovering the information recorded by said recording step (b) from a position on said recording member in predetermined time relationship to said sensing of step (e), and generating a fourth signal corresponding to said recovered information, thereby providing concurrent second and fourth signals representative of time-separated variables of said process.

4. A method for making concurrently available time-separated signals representative of physical properties of a material undergoing treatment in a process wherein said signals are time-separated by a variable time interval which depends upon the charge rate of said material into said process, comprising the steps of:
    (a) sensing a physical property of said process charge material and generating a first signal corresponding thereto;
    (b) recording a value representing said first signal on a movable recording member;
    (c) sensing said charge rate of said material into said process and generating a second signal corresponding thereto;
    (d) moving said recording member and regulating its speed in response to said second signal in a manner so that its speed is maintained substantially proportional to said charge rate of material into said process;
    (e) sensing a physical property of said process material at a point in said process which with respect to the treatment of said material is subsequent to the sensing of said step (a), and generating a third signal corresponding thereto; and
    (f) concurrently with said third signal generating step (e) recovering said first signal information recorded by said step (b), said recovering being performed from a position on said recording member corresponding in time to the sensing of said third signal generating step (e), thereby making concurrently available said recovered signal representative of a physical property of said process charge material with said third signal representative of a physical property of the same material at a point in said process time-separated therefrom, said recovered signal being thereby time-delayed in accordance with said charge rate of material into said process.

5. A method for making concurrently available signals representative of time-separated variables of a process for the treatment of material which are time-separated by a variable time interval related to the flow rate of said material undergoing treatment in said process, comprising the steps of:
(a) sensing a physical property of said material undergoing treatment in said process and generating a first signal corresponding thereto;
(b) recording a value representing said first signal on a movable recording member;
(c) sensing the flow rate of said material undergoing treatment in said process and generating a second signal corresponding thereto;
(d) moving said recording member and regulating its speed in response to said second signal in a manner so that its speed is maintained substantially proportionally to said flow rate of said material in said process;
(e) sensing a physical property of said process material at a point in said process which in relation to said treatment of said material is subsequent to said sensing of step (a), and generating a third signal corresponding thereto; and
(f) concurrently with said sensing of step (e) recovering said first signal information recorded by said step (b) from a position on said recording member which corresponds in time to said sensing of step (e), and generating a fourth signal corresponding to said recovered information, thereby making concurrently available signals representative of time-separated physical properties of said material treated in said process.

6. A method for automatic control of a process by controlling a controllable variable thereof in response to signals representative of time-separated variables of said process the time-separation of which depends upon a given rate variable of said process, comprising the steps of:
(a) sensing a process variable related to control of said process generating a first signal corresponding thereto;
(b) recording a value representing said first signal on a movable recording member;
(c) sensing said given rate variable of said process and generating a second signal corresponding thereto;
(d) moving said recording member and regulating its speed in response to said second signal in a manner so that its speed is maintained substantially proportional to said given rate variable;
(e) sensing a process variable related to control of said process, said sensing (e) being performed at a point in said process which in relation to the progress of said process is subsequent to said sensing of step (a) and generating a third signal corresponding thereto;
(f) concurrently with said third signal generating step (e) recovering said first signal information from a position on said recording member in predetermined time relationship to said sensing of step (e) and providing a fourth signal corresponding thereto;
(g) computing a correction required of said process controllable variable in a manner concurrently responsive to said third and fourth signals and generating a fifth signal corresponding to said correction; and
(h) controlling said process controllable variable in response to said fifth signal, thereby controlling said process in response to signals representative of time-separated variables thereof.

7. The method of claim 6 wherein said first, second, third, fourth, and fifth signals are electrical, and wherein said recording step (b) comprises recording said first signal electro-magnetically, said method comprising the further steps of:
(i) generating a reference electrical sixth signal of substantially constant intensity;
(j) electro-magnetically recording said reference sixth signal concurrently with said first signal on said movable recording member;
(k) recovering said reference sixth signal information concurrently with said recovering step (f) of recovering said first signal, and generating a reference seventh electrical signal corresponding to said recovered sixth signal;
(l) detecting the difference between the intensity of said reference sixth signal of step (i) and said recovered reference seventh signal of step (k) and providing a difference electrical eighth signal corresponding thereto; and
(m) correcting the intensity of said recovered fourth signal of step (f) in accordance with said difference eighth signal of step (l) and providing a corrected version of said fourth signal corresponding thereto for use as said fourth signal in said computing correction step (g), thereby providing a corrected version of said recovered first signal information for controlling said process.

8. The method of claim 6 wherein said second and fifth signals are electrical and wherein said first, third, and fourth signals are electrical signals the frequencies of which correspond to the respective variable represented thereby, wherein said recording step (b) comprises recording said first signal electromagnetically, said method comprising the further steps of:
(i) generating an electrical reference sixth signal of substantially constant frequency;
(j) electromagnetically recording said reference sixth signal concurrently with said first signal on said movable recording member;
(k) recovering said reference sixth signal information concurrently with said step (f) of recovering said first signal, and generating a reference seventh electrical signal having the recovered frequency of said recovered sixth signal;
(l) detecting the frequency difference between said reference sixth signal of step (i) and said recovered reference seventh signal of step (k) and providing a frequency error eighth electrical signal corresponding thereto;
(m) correcting the frequency of said recovered fourth signal of step (f) in accordance with said eighth signal of step (l) and providing a corrected version of said fourth signal corresponding thereto for use as said fourth signal in said computing correction step (g), thereby providing a corrected version of said recovered first signal information for controlling said process.

9. The method of claim 6 wherein said second and fifth signals are electrical and wherein said first, third and fourth signals are electrical signals in serial digital word format, and wherein said recording step (b) comprises recording said first signal electromagnetically, and wherein said third signal of step (e) and said recovered fourth signal of step (f) are digitally synchronized.

10. A method for monitoring the yield of a solvent refining process in which a refining solvent is introduced into said process with unrefined charge oil resulting in refining solutions, from which the refining solvent is thereafter separated resulting in extract oil and refined oil, and in which the yield may be expressed as a mathematical function of the refractive indices of charge oil, extract oil, and refined oil, and in which a substantially constant material inventory is maintained therein, comprising the steps of:
(a) making a first measurement, which is of the refractive index of said charge oil, at a point in said process prior to the introduction of said refining solvent, and providing a first signal corresponding thereto;
(b) recording a value representing said first measurement signal on a movable strip chart;
(c) making a second measurement, which is of the flow rate of said charge oil, at a point in said process prior to the introduction of said refining solvent, and providing a second signal coresponding thereto;

(d) moving said strip chart at a speed regulated to correspond to said charge rate second signal of step (c) such that the movement of said strip chart progresses in direct time relationship to said charge rate of said process;

(e) making a third measurement, which is of the refractive index of said refined product, and providing a third signal corresponding thereto;

(f) making a fourth measurement, which is of the refractive index of said extract product, and providing a fourth signal corresponding thereto;

(g) concurrently with said third and fourth measuring steps (e) and (f), recovering the first measurement signal recorded by said recording step (b) from a position on said strip chart which is a distance from the recording means of said recording step (b) corresponding to the average residence time, of a given increment of the oil in said process, between the measurement point of said first measuring step (a) and the measurement points of said third and fourth measuring steps (e) and (f) therein, and providing a fifth signal corresponding thereto;

(h) computing the yield of refined oil based upon said third and fourth signals of said measuring steps (e) and (f), and said fifth signal of said recovering step (g).

11. A method for control of an oil hydrofinishing process to improve the color of the product oil by reaction with hydrogen, based upon standard colorimeter measurements of charge oil and product oil, and wherein steps are taken for the control of the hydrogenation rate, comprising the steps of:

(a) making a first measurement, which is of said standard colorimeter color value of charge oil, at a point in process prior to the introduction of hydrogen, and providing a first signal corresponding thereto;

(b) recording said first measurement signal on a movable strip chart;

(c) making a second measurement, which is of the flow rate of charge oil, at a point in the process prior to introduction of hydrogen, and providing a second signal corresponding thereto;

(d) moving said strip chart at a speed regulated to correspond to said charge rate second signal of step (c) such that the movement of said strip chart progresses in direct time relationship to said charge rate of said process;

(e) making a third measurement, which is of said standard colorimeter color value of hydrofinished oil, and providing a third signal corresponding thereto;

(f) concurrently with said third measuring step (e), recovering the information recorded by said recording step (b) from a position on said strip chart which is a distance from the recording means of said recording step (b) corresponding to the average residence time, of a given increment of the oil in said process, between the measurement point of said first measuring step (a) and the measurement point of said third measuring step (e) therein, and providing a fourth signal corresponding thereto;

(g) computing corrections required of the process hydrogenation rate concurrently responsive to said third signal of said third measuring step (e) and said fourth signal corresponding to the recovered information of step (f), and providing a fifth signal corresponding thereto; and (h) controlling said hydrogenation rate in accordance with said fifth signal provided by said computing step (g).

12. A method for control of an oil hydrofinishing process as in claim 11 wherein the object of said hydrofinishing process is to improve the color of the product oil to a constant fraction of the color of charge oil, and wherein the process has a substantially constant hydrogenation rate, and steps are taken for controlling the charge rate, and for generating an electrical reference signal proportional to a target fractional color value, and wherein said third and fourth signals are electrical signals proportional to the respective measurements represented thereby, and wherein said step (g) comprises the steps of:
dividing said third signal of said third measuring step (e) by said fourth signal of said recovering step (f) and providing an electrical fifth signal proportional thereto, representing the fractional color value of said process; and
comprising said fifth signal of step (g) to said reference signal proportional to a target fractional color value;

and wherein step (h) comprises:

(h) controlling said charge rate to increase said process charge rate when said fifth signal of fractional color value is lower than said reference signal proportional to a target fractional color value, and controlling said charge rate to decrease said process charge rate when said fifth signal of fractional color is greater than said reference signal proportional to a target fractional color value.

13. An apparatus for time delay of a signal corresponding to a significant variable of a process for the treatment of material, and for regulating said time delay in accordance with the rate of treatment of said material in said process, comprising:

(a) first measuring means for sensing said variable of said process and for generating a first signal corresponding thereto;

(b) second measuring means for sensing the flow rate of material undergoing treatment in said process and for generating a second signal corresponding thereto;

(c) A recorder including a recording member movably mounted thereto, drive means for moving said recording member, recording means mounted to said recorder in the path of motion of said recording member for recording said first measurement signal upon said recording member, and speed regulating means responsive to said second signal for regulating the speed of said recording member in a manner proportional to said flow rate of said material in said process; and (d) means for recovering said recorded first signal and for generating a third signal corresponding thereto, said recovering means being mounted to said recorder at a position in the path of motion of said recording member to which recorded portions of said recording member pass subsequent to being recorded upon, thereby providing time delay for said first signal regulated in accordance with the rate of treatment of said material in said process.

14. An apparatus as in claim 13 in which said recorder (c) comprises:

(c) a chart recorder including a recording chart movably mounted thereto, drive means engaging said recording chart for moving said chart, speed regulating means engaging said drive means responsive to said second signal of said second measuring means for regulating the speed of said recording chart in accordance with said flow rate of material in said process, electrically conductive ink, a recording pen for recording said first measuring means signal upon said recording chart using said conductive ink and which is movably mounted to said chart recorder and in contact with said recording chart, and said recorder including means responsive to said first measuring means signal for moving said pen relative to said chart in a direction substantially transverse to the direction of motion of said chart, thereby recording said first measuring means signal upon said recording chart in the form of a continuous electrically conductive line the position of which corresponds to said first measuring means signal;

and wherein said means (d) for recovering said first measurement signal comprises:

an electrical resistance element having a resistance which varies with its length mounted to said chart recorder in electrically insulated relationship thereto at a position in the path of motion of said recording chart to which recorded portions of said chart pass subsequent to being recorded upon, and mounted with its length substantially transverse to the direction of motion of said recording chart and in contact therewith resulting in electrical contact with said recorded line;

an electrically conductive element mounted to said chart recorder in electrically insulated relationship thereto at a position immediately adjacent to said resistance element, and electrically insulated therefrom, said conductive element being in contact with said recording chart resulting in electrical contact with said recorded line, thereby forming an electrical path through said conductive element, through said resistive element, and through said recorded line between said elements;

a Wheatstone bridge circuit one resistance leg of which is connected to said resistive and conductive elements to sense the resistance of said electrical path and generate a third signal corresponding thereto; and an electrical amplifier circuit connected to said Wheatstone bridge circuit detecting and amplifying said third signal, and generating an output fourth signal corresponding thereto, whereby said fourth signal represents the position of said recorded line at its point of intersection with said resistance element, thereby providing a fourth signal representing said first measurement signal time delayed in accordance with and in response to said measured flow rate of material undergoing treatment in said process.

15. An apparatus as in claim 13 in which said recorder (c) comprises:

(c) a circular chart recorder including a circular recording chart rotatably mounted thereto, drive means engaging said recording chart for angular movement thereof, speed regulating means engaging said drive means responsive to said second signal of said measuring means for regulating the angular speed of said recording chart in accordance with said flow rate of material in said process, a recording pen movably mounted to said chart recorder and in contact with said recording chart, and said recorder including means responsive to said first measuring means signal for moving said pen relative to said chart in a direction substantially radial with respect to said recording chart, thereby recording said first measuring means signal upon said recording chart in the form of a continuous line the radial position of which corresponds to said first measuring means signal;

and wherein said means (d) for recovering said first measurement signal comprises:

(d) an optical tracking device slidably mounted to said chart recorder along a line of motion which is substantially radial with respect to said recording chart and which is located an angular distance from said recording pen to which recorded portions of said chart pass subsequent to being recorded upon, said tracking device detecting the position of said recorded line and producing an electrical third signal corresponding to the radial position of said recorded line, thereby recovering said recorded first measurement signal after a time delay responsive to said second signal representing the flow rate of material undergoing treatment in said process.

16. An apparatus as in claim 13 in which said first measuring means (a) provides an electrical signal corresponding to said first measurement and wherein said recorder (c) comprises:

(c) an electrical tape recorder including, a recording tape movably mounted thereto, drive means for moving said tape, speed regulating means responsive to said second signal of said second measuring means for regulating the speed of said recording tape in accordance with said flow rate of material in said process, and recording means mounted in the path of motion of said recording tape for recording said first measuring means signal; and said means (d) for recovering said first measurement signal comprises:

(d) playback means for recovering said recorded first measurement signal and for providing a third signal corresponding thereto, mounted to said recorder at a position in the path of motion of said recording tape to which recorded portions of said tape pass subsequent to being recorded upon, thereby providing time delay for said first measurement signal in accordance with and in response to said measured flow rate of material undergoing treatment in said process.

17. An apparatus as in claim 13 in which said first measuring means (a) provides an electrical signal the frequency of which corresponds to said first measurement and wherein said recorder (c) comprises:

(c) an electrical tape recorder including, a recording tape movably mounted thereto, drive means for moving said tape, speed regulating means responsive to said second signal of said second measuring means, for regulating the speed of said recording tape in accordance with said flow rate of material in said process, a reference frequency generator for generating a substantially constant reference frequency electrical fourth signal, and recording means mounted in the path of motion of said recording tape for recording said first measuring means signal and said reference frequency fourth signal; and said means (d) for recovering said first measurement signal comprises:

(d) a playback head for recovering said recorded first and fourth signals and for providing third and fifth signals respectively corresponding thereto mounted to said recorder at a position in the path of motion of said recording tape to which recorded portions of said tape will pass subsequent to being recorded upon, a frequency comparator and compensator including means for comparing said recovered reference frequency fifth signal to said generated reference frequency fourth signal and correcting said recovered third signal for frequency variations incurred due to said recording speed regulation in accordance with said second signal of said second measuring means and for providing a sixth signal corresponding thereto, and a demodulator including means for demodulating said sixth signal and for providing a direct electrical seventh signal corresponding thereto, thereby providing a seventh signal representing said first measurement time delayed in accordance with and in response to said measured flow rate of material undergoing treatment in said process.

18. An apparatus for making concurrently available measurements of time-separated performance related process variables wherein said process exhibits a substantially constant material inventory, an inward charge rate, and an outward flow, of material undergoing treatment therein, comprising:

(a) first measuring means for measuring a process variable, having a significant relationship to process performance, and producing a first signal corresponding thereto;

(b) second measuring means for measuring said charge rate of material entering said process and producing a second signal corresponding thereto;

(c) a recorder including a recording member movably mounted thereto, drive means for moving said recording member, a recording means mounted to said recorder in the path of motion of said recording member for recording said first measurement signal upon said recording member, and speed regulating means responsive to said second signal of said second measuring means for regulating the speed of said recording member in direct relationship to said charge rate of said process;

(d) third measuring means, for measuring a process variable having a significant relationship to process performance and providing a third signal corresponding thereto, mounted at a point in said process which is time-separated and downstream from said first measuring means (a); and (e) means for recovering said recorded first measurement signal and for providing a fourth signal corresponding thereto, mounted to said recorder at a position in the path of motion of said recording member to which recorded portions of said recording member pass subsequent to being recorded upon, and which is a distance along said path from said recording means corresponding to the average residence time, of a given increment of the material in said process, between the measurement points therein of said first measuring means (a) and said third measuring means (d), thereby making concurrently available said signals corresponding to measurements of time-separated process variables in accordance with the residence time of said material in said process.

19. An apparatus for monitoring the yield of a solvent refining process in which refining solvent is introduced to unrefined charge oil resulting in refining solutions, from which the solvent is separated resulting in extract oil and refined oil, and in which the yield may be expressed as a mathematical function of the refractive indices of charge oil, extract oil, and refined oil, comprising:

(a) means including a first refractometer for measuring the refractive index of charge oil introduced into said process and for producing a first signal corresponding thereto;

(b) flow measuring means for measuring the charge rate of oil entering said process and producing a second signal corresponding thereto;

(c) a chart recorder including a recording chart movably mounted thereto, drive means for moving said chart, a recording means for recording said first refractometer measurement first signal upon said chart, and speed regulating means responsive to said flow measuring means second signal for regulating the speed of said recording chart in direct relationship to said charge rate of said process;

(d) means including a second refractometer for measuring the refractive index of extract oil produced by said process and for producing a third signal corresponding thereto;

(e) means including a third refractometer for measuring the refractive index of refined oil produced by said process and for producing a fourth signal corresponding thereto;

(f) means for recovering said first refractometer measuring signal and for producing a fifth signal corresponding thereto mounted to said chart recorder at a position in the path of motion of said recording chart to which recorded portions of said chart pass subsequent to being recorded upon, and which is a distance along said path from said recording means corresponding to the average residence time, of a given increment of the oil in said process, between the measurement point therein of said first refractometer, and the measurement points therein of said second and third refractometers; and (g) computing means responsive to said recovered fifth signal of recovering means (f) and said refractometer third and fourth signals, for computing the yield of said process in accordance with said mathematical function and for producing an output signal corresponding thereto.

20. An apparatus for control of an oil hydrofinishing process wherein the object of the process is to improve the color of the product oil, by reaction with hydrogen, to a constant fraction of the color of charge oil based upon standard colorimeter measurements of charge oil and product oil, and wherein the process has a substantially constant hydrogenation rate, and means included therein for controlling the charge rate, and for generating a signal corresponding to a target fractional color value, comprising:

(a) means including a first colorimeter for measuring the standard color value of charge oil introduced into said process and for producing a first signal corresponding thereto;

(b) flow measuring means for measuring the charge rate of oil entering said process and for producing a second signal corresponding thereto;

(c) a chart recorder including a recording chart movably mounted thereto, drive means for moving said chart, a recording means for recording said colorimeter first signal upon said chart, and speed regulating means responsive to said flow measuring means second signal for regulating the speed of said recording chart in direct relationship to said charge rate of said process;

(d) means including a second colorimeter for measuring the standard color value of hydrofinished oil at a point in said process subsequent to the introduction of hydrogen into said process and for producing a third signal corresponding thereto;

(e) means for recovering said colorimeter measurement first signal mounted to said chart recorder at a position in the path of motion of said recording chart to which recorded positions of said chart pass subsequent to being recorded upon, and which is a distance along said path from said recording means which corresponds to the average residence time, of a given increment of the oil in said process, between the measurement points therein of said first colorimeter (a) and said second colorimeter (d), for recovering said recorded colorimeter measurement first signal and for producing a fourth signal corresponding thereto;

(f) automatic computing means responsive to said third signal of said colorimeter (d) and said recovered colorimeter fourth signal of recovering means (e) performing a division of said third signal by said fourth signal and producing a quotient fifth signal corresponding thereto; and (g) means including a controller operatively coupled to said charge rate control means for comparing said quotient fifth signal with said target fractional color value signal and operating said charge rate control means to decrease said process charge rate when said quotient fifth signal is higher than said target value, and to increase said process charge rate when said quotient fifth signal is lower than said target value.

References Cited

UNITED STATES PATENTS

| | | | |
|---|---|---|---|
| 2,683,254 | 7/1954 | Anderson et al. | 340—174.1 |
| 2,989,726 | 6/1961 | Crawford et al. | 235—181 X |
| 3,240,919 | 3/1966 | Schultz | 235—181 X |
| 3,288,706 | 11/1966 | Lupfer | 235—151.12 |

MALCOLM A. MORRISON, Primary Examiner

F. D. GRUBER, Assistant Examiner

U.S. Cl. X.R.

208—341; 235—151.3; 340—174.1

PO-1050
(5/69)

UNITED STATES PATENT OFFICE
CERTIFICATE OF CORRECTION

Patent No. 3,539,784            Dated November 10, 1970

Inventor(s)  Robert A. Woodle

It is certified that error appears in the above-identified patent and that said Letters Patent are hereby corrected as shown below:

COLUMN 2, line 50, "point-to-point" should be --point-by-poi

COLUMN 3, line 9, "variable" should be --variables--

COLUMN 9, line 21, "rcording" should be --recording--

CLAIM 12, line 17, (Column 16, line 13) "comprising" should be --comparing--

Signed and sealed this 13th day of July 1971.

(SEAL)
Attest:

EDWARD M. FLETCHER, JR.              WILLIAM E. SCHUYLER, JR.
Attesting Officer                    Commissioner of Patents